April 14, 1942. F. R. WERNER 2,279,805
CASH REGISTER
Filed May 11, 1938 6 Sheets-Sheet 1

Inventor
Frank R. Werner
By Carl Beust
His Attorney

April 14, 1942.  F. R. WERNER  2,279,805
CASH REGISTER
Filed May 11, 1938  6 Sheets-Sheet 3

Inventor
Frank R. Werner
By Carl Benst
His Attorney

April 14, 1942.  F. R. WERNER  2,279,805
CASH REGISTER
Filed May 11, 1938   6 Sheets-Sheet 4

Inventor
Frank R. Werner
By Earl Benst
His Attorney

April 14, 1942.　　　F. R. WERNER　　　2,279,805
CASH REGISTER
Filed May 11, 1938　　　6 Sheets-Sheet 5

Inventor
Frank R. Werner
By Earl Beust
His Attorney

April 14, 1942.  F. R. WERNER  2,279,805
CASH REGISTER
Filed May 11, 1938   6 Sheets-Sheet 6

Frank R. Werner
Inventor
By Carl Benit
His Attorney

Patented Apr. 14, 1942

2,279,805

UNITED STATES PATENT OFFICE 2,279,805

CASH REGISTER

Frank R. Werner, Dayton, Ohio, assignor to The National Cash Register Company, Dayton, Ohio, a corporation of Maryland Application May 11, 1938, Serial No. 207,244

5 Claims. (Cl. 235—23)

This invention relates to improvements in cash registers, and more particularly to indicating mechanism for cash registers adapted to be actuated by differentially settable members.

The mechanism, an improvement to that disclosed in United States Letters Patent 1,804,650, issued to Bernis M. Shipley, is disclosed as applied to a cash register of the general type described in United States Letters Patent 2,031,860, issued to Bernis M. Shipley, to which patents reference is made.

One of the objects of the invention is to provide an indicator or symbol carrier having lateral compactness without sacrifice of visibility as by reduction in size of the characters or symbols to be indicated.

Another object of the invention is to provide a positive alining mechanism for the symbol carriers.

Another object of the invention is to provide improved mechanism for shifting and rotating the symbol carriers on their axes.

Another object of the invention is to provide a novel mechanism for causing independent motion among a plurality of symbol carriers by the use of a single differentially settable member.

Another object of the invention is to provide an improved construction for symbol carriers of polygonal cross-section.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

General description

The novel indicator mechanism is shown in this disclosure as applied to what is known in the art as the key lever operated type of cash register.

The particular cash register construction shown has a keyboard accommodating amounts up to and including $3.95 (the keys for values below the even dollars being in five cent graduations), two clerk's classifications, and two transaction classifications, namely "paid out" and "no sale." No key representing "cash" is provided as a "cash" entry may be made by merely depressing a "clerk's" key and the proper amount keys.

The indicator mechanism to be described may be placed on cash registers of other construction having equivalent differential action as will be apparent.

The disclosed cash register is equipped with a key coupler, differential members controlled by the keys, auxiliary differential members providing for a minimum movement of the indicator parts thus eliminating resetting the indicators to zero for each new setting thereof, and transmission elements. These various elements, though broadly old in the art, will be briefly explained for the purpose of showing how the indication is set according to the data entered into the machine.

The totalizers and printing mechanism are not shown because they are not necessary to an understanding of the invention although it is well known that in such machines the differentially settable members are used to control the totalizers and the printing elements, as well as the indicators.

The amount indicating mechanism, as stated, is similar to that shown in United States Letters Patent 1,804,650, issued to Bernis M. Shipley and consists in general of indicators or symbol bearing elements of pentagonal cross-section mounted on shafts in such a manner as to be both rotatable and shiftable, allowing the selected symbols on different sections, differentially set, to become visible through viewing apertures. There are two groups of these amount symbol carriers provided, one for front reading and one for rear reading, each group displaying the same data.

The transaction and clerks symbols are carried on front and rear targets having a reading position directly above the amount reading apertures.

Improvements in the construction of both the target and the pentagonal symbol carriers, the mode of setting them and their alinement constitute the principal features of the invention and will be described in detail.

In the Shipley Patent 1,804,650 to which reference was made, the symbols bearing the transaction data are arranged on carriers of polygonous cross-section rotatably mounted on a transverse axis located to one side of the vertically positioned carriers bearing the amount symbols. In the present invention, for the purpose of economizing lateral space the transaction symbols are carried on targets read through an aperture above that provided for reading the amount symbols. The targets are raised or lowered to reading position as the transaction demands.

Detailed description

The framework of the machine consists of a plurality of vertical frame plates 60 (Figs. 1 and 2) running from the front to the rear of the machine supported and braced by a cross member 58, by a cross member 61 (Fig. 1) and by various journaled shafts used as transmission elements which will be noted as they are described. A back frame plate 59 (Fig. 2) serves as additional bracing for the vertical frame plates 60 and as a supporting structure for various shafts.

Keyboard

Figures 1, 13:
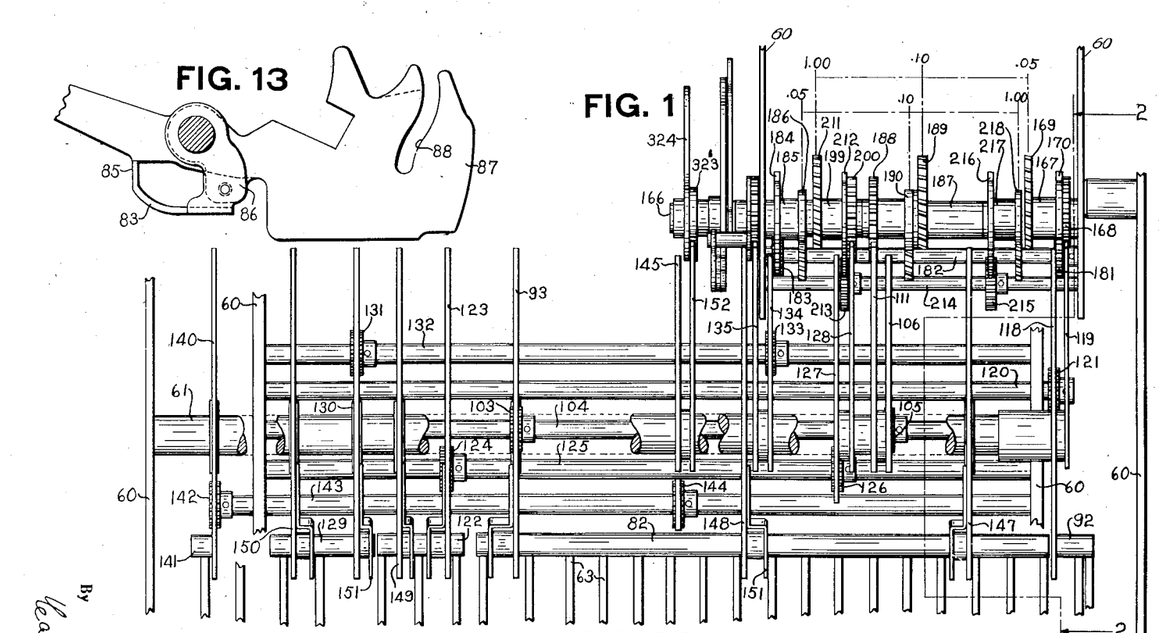
Fig. 1 is a front elevation, in diagrammatic form, showing portions of the key levers, universal bars for the key banks, transmission shafts, differential actuators, and indicator driving segments.
Fig. 13 is a side view of the mechanism shown in Fig. 12.
Figure 20:
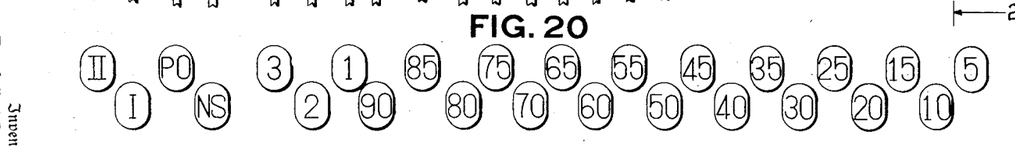
Fig. 20 is a plan view of the keyboard and illustrates one arrangement of amount keys and special keys.

As shown in Figs. 1 and 20, the keys 63 (Figs. 1, 2, 4, and 12) are arranged in five groups, the two left-hand keys I and II (Fig. 1) being the "clerk" keys, the next two keys PO and NS being the "transaction" keys representing "paid out" and "no sale," the next group of three keys 3, 2, and 1 representing "dollars," the next group of eighteen keys representing "five cents," and multiples of "five cents." These groups are known as "banks," each group differentially controlling a single differentially settable member, with the exception of the 5 cent key which has its own differential member, which member is also associated with and operated by those keys representing uneven multiples of five cents. The latter keys therefore each control two differential members.

The symbol indicating a cash sale, as will be shown, is always in evidence if neither the "paid out" or the "no sale" keys are depressed.

All of the keys 63 are pivotally mounted on a supporting rod 62 (Figs. 2, 4, and 12) which is secured in the frame plates 60. The forward ends of the keys, bearing designating tips, are adapted to be pressed down so as to cause the rear ends of the keys to rise, rod 62 acting as a center.

Key coupler

Figures 2, 3, 12, 18, 19:
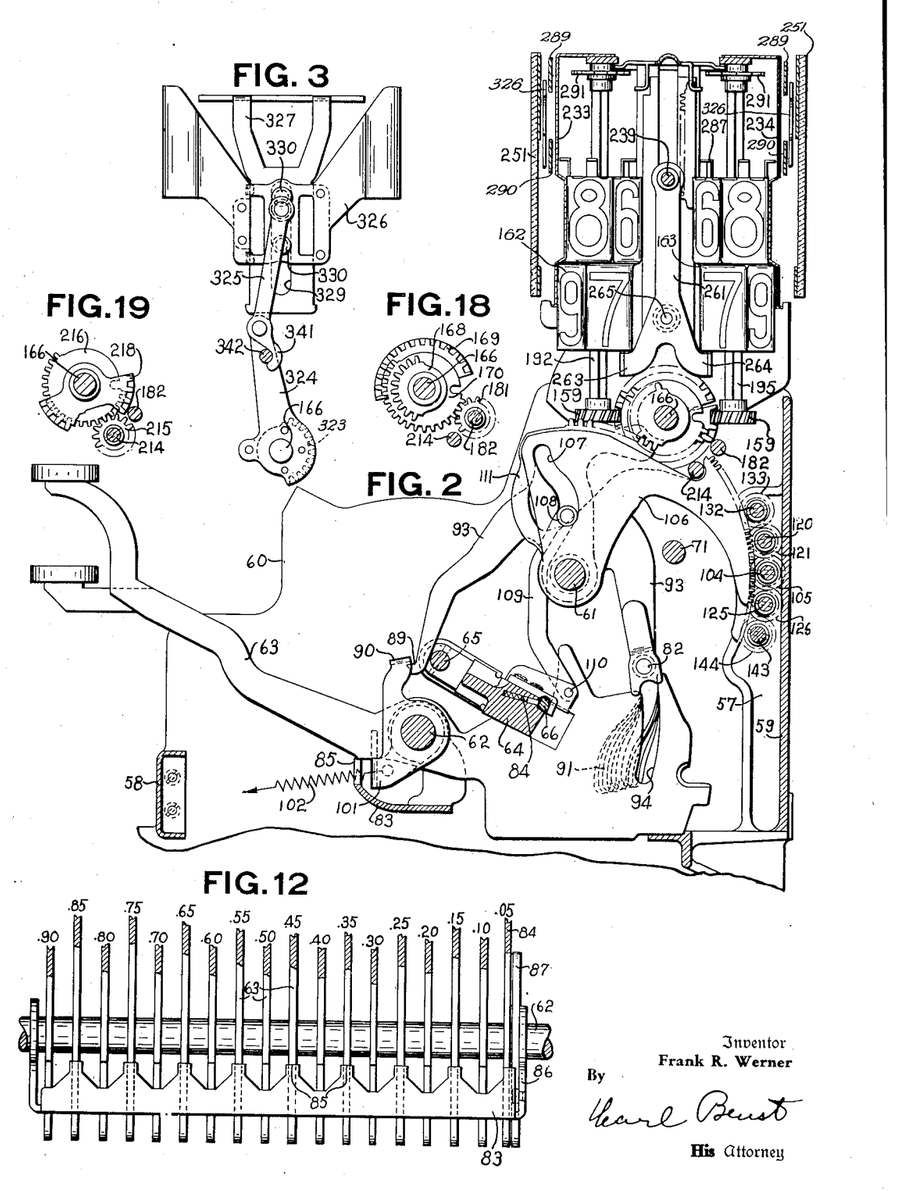
Fig. 2 is a vertical section taken on the line 2—2 in Fig. 1 through the differential and the indicating mechanisms and viewed from the right.
Fig. 3 is a detail end view showing the driven mechanism for the clerk's indicator as viewed from the left side.
Fig. 12 is a front view of the mechanism for actuating the five cent actuator by the keys assigned to values representing uneven multiples of five.
Fig. 18 is a detail of the segments driving the "cents" indicator for front reading and the lateral transmission shaft for the cents indicator for rear reading.
Fig. 19 is a detail of the segments driving the "dollar" indicator for rear reading.

A key coupler 64 (Figs. 2, 4, and 14) securely mounted on a shaft 65, which is journaled in the frame plates 60, rests across all of the keys and by its weight normally retains the keys in the position shown in Fig. 2. The key coupler also functions in the usual manner to provide a flexible keyboard whereby a number of keys may be conditioned to operate by being hooked thereto and the machine finally operated by complete depression of one of the keys hooked to the key coupler, whereupon the key coupler is rocked, carrying with it, to complete their action, all the keys thereon hooked. In registering a transaction involving a number of keys the operator depresses the keys one after the other to an intermediate position and the last key to be used is usually given a full movement which completes the operation of the machine, entering into it the data represented by all the keys depressed.

As a key 63 (Fig. 2) is partially depressed at the forward end, a counter-clockwise movement is given to it around rod 62 as a center. The key coupler 64 is given a similar counter-clockwise movement thereby rocking shaft 65. The rod 62 and shaft 65 are so positioned that continued movement causes the resilient edge 66 of the key coupler, which edge is actuated by springs 84, to engage beneath the shoulder 67 (Figs. 2 and 4) on the depressed key lever, and in front of the shoulders 67 of the undepressed keys. A full stroke mechanism, to be described, prevents the key coupler, through control of shaft 65, from returning to home position at this time. Keys subsequently partially depressed are hooked onto the raised key coupler, such being made possible by the resilient edge 66. By means well known in the art, not described in this disclosure, only one key in a given keybank may be depressed at one transaction. Therefore, by providing individually mounted resilient edges 66 (Fig. 14) on the key coupler for each bank of flexible keys, the possibility of releasing a hooked key, by depressing another key in the same bank, is avoided. After all the desired keys have been hooked on the key coupler, any one of such keys may be used to force the key coupler to complete the first half of its oscillatory movement, after which the weight of the key coupler returns the keys to normal position completing the second half of the oscillatory movement of the key coupler, terminating that transaction.

Special constructions of the keys and key coupler may be provided. Thus any key may be provided with a notch 68 as shown in the transaction key PO (Fig. 4) preventing that key from being used to complete an oscillation of the key coupler. In the machine as illustrated here the clerks' keys marked I and II and the transaction key PO are the only ones so notched. When a clerk's key is depressed the upward movement of the rear end of the key will continue until the lower, rear edge of the coupler (which portion is a rigid part of the coupler) strikes the rear wall of the notch 68 of the depressed clerk's key thus preventing further depression of the key. This movement of the depressed key is sufficient to rock the coupler an extent sufficient to raise the flexible tips of the coupler into effective position with relation to the amount keys. The edge of the key coupler may be non-resilient as shown at 69 (Fig. 14) which prevents a clerk's key in that bank from being hooked on unless it be the first depressed. Such key and key coupler construction is broadly old and well known in the art, and requires no further explanation.

Full stroke mechanism

Near the right end of the key coupler shaft 65 is secured a lever 70 which is rocked first counterclockwise (as viewed in Fig. 9), as a key is depressed, and then clockwise, as the key returns to home position. This rocking motion of lever 70, caused by the oscillation of the key coupler, is used to turn drive shaft 71 one complete rotation for every machine operation by means of pinion 72 and rack 73, pivotally mounted on lever 70 by stud 78. On the counter-clockwise movement of lever 70 the rack 73 is forced upwardly and rearwardly with the teeth 74 of the rack 73 held in contact with the pinion 72 by means of nose 76 bearing on a guide 77 against which it rests until the completion of the counter-clockwise motion of lever 70. During the first part of the counter-clockwise motion of the lever 70, the spring 75 tends to turn the rack 73 counter-clockwise around the stud 78, but before the counter-clockwise motion of the lever 70 is finished the stud 78 passes the line of pull of spring 75 and therefore the stud 78 as a center of rotation moves to cause the spring to try to turn rack 73 clockwise, which happens before nose 76 reaches the top of the forward slope of guide 77. As the nose 76 passes beyond the guide 77 it will snap over the end thereof under the action of spring 75 just as the coupler reaches the end of its counter-clockwise movement. Then during the return movement of the rack 73, the nose 76 following the contour of guide 77 bears against its rear side and causes teeth 79 to engage pinion 72 as the lever 70 and key coupler turn clockwise, causing the pinion 72 and shaft 71 to turn the remaining half of its complete rotation. A saw toothed ratchet wheel 80, secured to shaft 71, is engaged by a pawl 81 allowing the shaft 71 to turn in a counter-clockwise direction only and consequently requiring completion of every commenced operation of the machine.

Differential mechanism

The keys are divided, as described, into groups or banks, and each bank of amount keys controls a differentially settable member. The "dollar" keys control the dollars differentially settable member, the keys representing even multiples of 5 cents under a dollar control the "tens of cents" differentially settable member, the 5 cents key controls the "units of cents" differentially settable member, and the keys representing odd multiples of 5 cents, control both the units and the "tens of cents" differentially settable members.

Fig. 2 representing the "tens of cents" differential element and indicators will serve to illustrate the differential mechanism for all the key banks.

All of the keys 63 representing multiples of 5 cents, except the 5 cents key, each have a cam slot 94, open at the top end, and located and shaped so as to engage a universal bar 82 mounted on the tens of cents differentially settable member 93, as the front end of the key lever is depressed causing a counter-clockwise motion of the key around shaft 62. In addition to the bar 82 there is one universal bar 122, associated with the "dollars" key bank, long enough to accommodate all the keys in the "dollar" bank, and a bar 92 for the 5 cents key.

The cam slots for "the tens of cents keys" representing amounts having the same digit in the decimal order of dimes, are shaped alike. Thus, the keys representing "10 cents" and "15 cents," are shaped alike, and those representing "20 cents" and "25 cents" are shaped alike but different from the "10 cent" and "15 cent" keys.

It is the purpose of the cam slots 94 of "tens of cents" bank, to set the universal bar 82, and an actuator 93, associated with the "ten cent" key bank, according to the "tens" digit of the value of the key depressed. To accomplish this result, the cam slots 94 are graduated so that the key of a lower value of dimes moves the universal bar 82 less than the key of next higher value of dimes. Thus the 10 cents and the 15 cents keys move the bar 82 one step, the 20 cents and 25 cents keys move the bar 82 two steps, the 30 cents and the 35 cents keys move the bar 82 three steps, etc. These graduations are illustrated diagrammatically by the dotted lines 91 in Fig. 2, said representation not showing the cam slots of all the keys, however. The actuator 93 is pivoted on cross member 61, and is provided with a forwardly extending arm terminating in a toe 89, and a rearwardly extending arm bearing a series of teeth meshing with a pinion 103 (see also Fig. 1) fastened on a shaft 104. The purpose of the actuator 93 is to provide a differentially settable member for controlling the setting of an indicator in the manner hereinafter described.

The 5 cent key is provided with a cam slot 94, similar to the "tens of cents" keys 63. The cam slot 94 of the 5 cent key is shaped to engage the bar 92 and rock the differentially settable member for the "units of cents" bank, five steps.

The 45 cent key 63 is depressed to register a transaction involving 45 cents, and the depression of the "45 cent" key moves the "tens of cents" universal bar to register 40 cents. A universal bail 83 (Fig. 12) is arranged so that each key 63, representing a number ending in 5 cents, operates the universal bar 92 (Fig. 1), as does the "five cent" key, just as though the operator had pressed the "five cent" key. This provides for registering 5 cents in addition to the number of dimes registered. The universal bail 83 has a raised portion 85 (Fig. 12) under each "tens of cents" key bearing the "5 cent" symbol so that depression of such a key will cause a rocking of the bail 83 around shaft 62 as a center. To a right side piece 86 (Figs. 12 and 13) of the universal bail, is fastened a plate 87, shaped like the rear end of an amount key and having a cam slot 88 of the same shape as that of the "5 cent" key. By this construction, the "5 cent" key will remain stationary although the "5 cent" universal bar is moved the same distance as though the "5 cent" key had been depressed. The mechanism just described is broadly old and well known and is fully shown and described in United States Letters Patent No. 1,744,183, issued to E. J. Von Pein on January 21, 1930, and needs no further disclosure.

There is one universal bar for each key bank. It is the function of each universal bar to transmit the differential movement, given to it by its associated key lever cams, to its associated actuator.

Still considering the "tens of cents" key bank, shown in Fig. 2, as an example, the universal bar 82 and the actuator 93 are moved, as a key is depressed, in a clockwise manner about the shaft 61 as a center. The amount of this angular movement is proportional to the tens digit value of the key depressed, so that upon completion of the first half of the operative cycle of the machine, the corresponding actuator 93 is moved to a position in accordance with the tens digit value of the key depressed.

The forwardly extending toe 89 (Fig. 2) of the actuator 93 is adapted to be engaged by a latching pawl 90 pivotally mounted on rod 62. The pawl 90 is provided with a bail 101 contacting the lower edges of all the key levers in the "tens of cents" bank. A spring 102 retains the bail against the key levers 63 and in so doing holds the pawl 90 over the toe 89 thus locking the actuator 93 against chance movement. Depression of any key in the key bank causes the bail 101 associated with that key bank to rock counter-clockwise around shaft 62 as a center carrying with it pawl 90, releasing the actuator 93 for movement by the key lever cams. Each actuator is supplied with a similar latch.

Because the driven mechanism of the indicators is on the right side of the machine it is necessary to provide for lateral transmission of the differential motion of the actuators for each key bank.

In Fig. 1, the universal rod 82, representing the "tens of cents" bank of keys, moves the actuator 93 differentially, which, through teeth, on a rearwardly extending arcuate arm, engaging the pinion 103 secured to the "tens of cents" bank transmission shaft 104 (Figs. 1 and 2) turns the shaft 104 differentially. The shaft 104 is journaled in forwardly projecting flanges 57 of the rear frame plate 59 of the machine and has mounted on it near the right end a pinion 105 which engages a segment 106 also rotatably mounted on the cross member 61. In the forward portion of segment 106, is cut a cam slot 107 (Fig. 2) acting as a guide for a roller 108 mounted on one end of a link 109, whose other end is pivotally mounted at 110 to a flange on the key coupler 64. The cam slot 107 is of sufficient length to accommodate the full movement of roller 108. At the full depression of a key, the key coupler 64 has raised the roller 108 to its highest possible point and at the same time the segment 106 has been differentially set through the pinion 105 causing a positioning of the cam slot 107 so as to differentially position the roller 108 around the cross member 61 as a pivot point. Rotatably mounted on cross member 61, to the left of the segment 106, is a segment 111 having a pear shaped opening 112 cooperating with roller 108 to differentially set the segment 111 from its previous setting to the new setting with a minimum movement. The roller 108 is wide enough to ride in both cam slot 107 and opening 112. Since the position of segment 106 is differentially determined by the cam slot 94 engaging the universal bar 82, through pinion 103, shaft 104 and pinion 105, the slot 107 determines the position to which the roller 108 moves the segment 111, as the roller 108 is guided upwardly in the slot 107. This upward guided movement of roller 108, causes the roller to wipe against either wall of the pear shaped opening 112 to move the segment 111 from its last position directly into its new position, as determined by the depressed key. The setting of segment 111 differentially sets the symbol carriers registering dimes, as will be described.

Each key bank except the "5 cent" key bank which requires no lateral transmission has a similar mechanism to differentially set the indicator mechanism associated therewith.

The "5" cent key, and plate 87, through bar 92, set a differential actuator 118 directly, which sets the associated minimum movement segment 119. A shaft 120 and a pinion 121 driven by differential actuator 118 transmit the differential motion of the actuator to the printing and accounting devices of the cash register printing and accounting devices which are not shown here. No lateral transmission of the differential motion is needed in the case of the "5 cent" key as its minimum movement segment is in direct line with the indicator mechanism it drives.

The "dollar" keys through the universal bar 122 set a differential actuator 123 (Fig. 1), similar in outline to the actuators 93 and 118, and whose motion is transmitted through a pinion 124, shaft 125, pinion 126 and segment 127 to the minimum movement segment 128 which sets the dollar indication mechanism. The segments 127 and 128 are like segments 106 and 111, respectively, and the segment 128 is adjusted under control of segment 127 by a roller like the roller 108, in the same manner as roller 108 adjusts the segment 111 under control of the segment 106.

The "transaction" keys through a universal bar 129, differential actuator 130, pinion 131, shaft 132, pinion 133, segment 134, and a minimum movement segment 135, transmit their differential setting to the transaction indicator mechanism in the same manner as the "tens of cents" keys set their indicator mechanism.

The "clerk's" key bank contains two keys I and II. Key I does not operate any of the indicator mechanism, as the normal condition of said mechanism displays the symbol I making it necessary to change such showing only when a transaction by the II clerk is entered. The II key, through a stud 141, pinion 142, transmission shaft 143, pinion 144, segment 145, and minimum movement segment 152, actuates the indicating mechanism in the same manner as the "tens of cents" keys set their indicator mechanism, so as to change the clerks symbol.

All of the above described differential mechanism is old in the art, and is given herein to show one method by which the hereinafter described indicator mechanism can be differentially controlled.

It will be noted that auxiliary supporting members 147, 148, 149, 150 (Fig. 1) are provided for certain of the universal bars, said supporting members being mounted similarly to the differential actuators and cooperate with them, and the universal bars with which they are associated, to form a rigid construction. Brackets 151 are provided where the differential actuators and supporting members are joined to the universal rods, said brackets engaging circumferential grooves in said universal bars to provide lateral rigidity.

*Indicator frame*

Secured to bent over ears on the top vertical frames 60 (Figs. 7, 10, and 11) that support the indicating mechanism, are cross pieces 155 forming the top of the indicator framework.

Figures 6, 7, 8, 9:
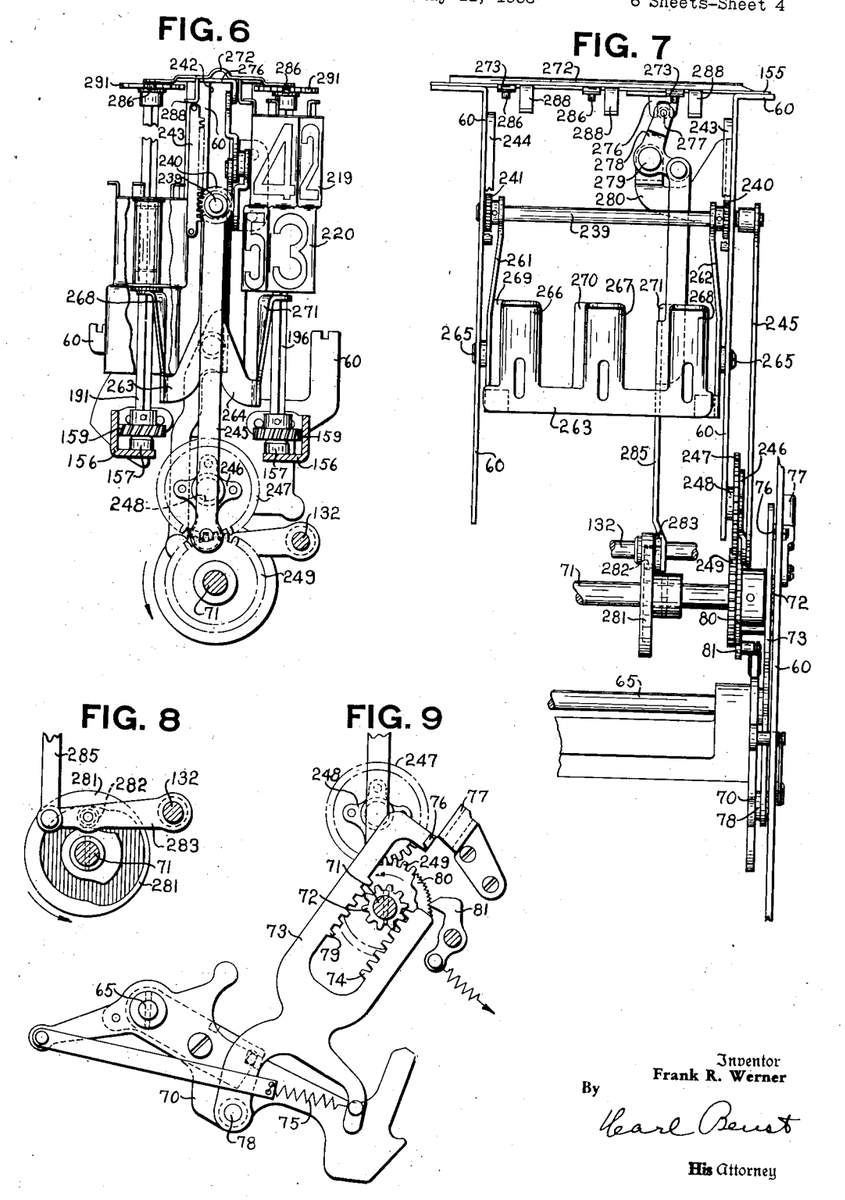
Fig. 6 is a right side elevation, partly in section, of the driven mechanism for shifting the polygonous symbol carriers on their supporting shafts.
Fig. 7 is a front elevation of the alining mechanism for the polygonous symbol carriers, and of the mechanism for shifting said carriers.
Fig. 8 is a right side view of the cam for controlling the alining mechanism for the polygonous symbol carriers.
Fig. 9 is a right side view of the rack and pinion for driving the shifting and alining mechanism for the polygonous symbol carriers, and the full stroke mechanism.
Figure 10:
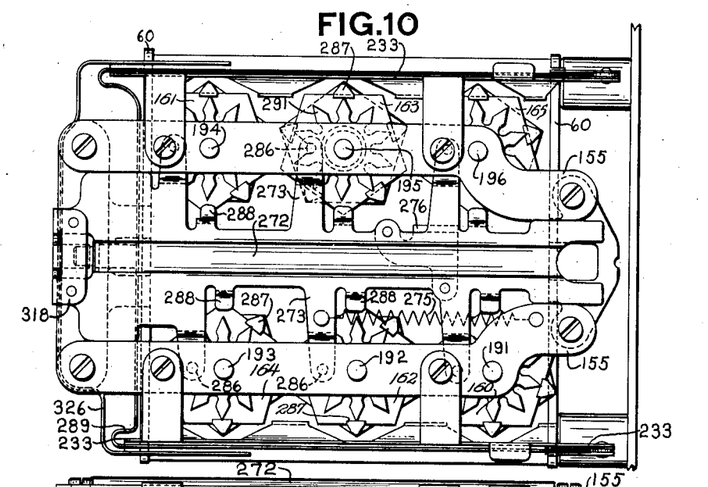
Fig. 10 is a top plan view of the indicator mechanism.

In Fig. 6 are shown transverse members 156, joined by angle brackets to the frames 60, on which bearing collars 157 are secured. The bearing collars are adapted to receive the turned ends of square shafts 191, 192, 193, 194, 195, and 196 (Figs. 6 and 10) on which the amount symbol carriers, to be later described, are shiftably mounted. Shafts 191, 192, and 193 (Figs. 10 and 11) support the amount symbol carriers for "front" reading, and the shafts 194, 195, and 196 (Fig. 10) support the amount symbol carriers for "rear" reading. The tops of shafts 191, 192, 193, 194, 195, and 196 are journaled in the cross pieces 155 as shown in Fig. 10. On the lower ends of shafts 191, 192, 193, 194, 195, and 196 are secured pinions 159 (Figs. 2, 6 and 11) which are driven differentially in a manner to be described.

*Differential setting of amount indicators*

As is customary in the cash register art, means is provided to display amounts on the indicators so that the reading of the digits is from left to right, requiring a converse order of the data on the rear symbol carriers, as compared with the same data on the front symbol carriers. Symbol carriers 160 and 161 (Fig. 10) are set under control of the "5 cent" key symbol carriers 162 and 163 are set under control of the "10 cent" keys and symbol carriers 164 and 165 are set under control of the "dollar" keys.

As the minimum movement segments 106, 119, and 128, which drive the symbol carriers, are not in alinement with the mechanism they drive, means has been provided to transmit laterally their differential motion to both the front and rear reading symbol carriers, which includes in the case of the "5 cent" and "dollar" mechanism means to avoid interference with the intermediate "10 cent" mechanism.

A sleeve 167 is rotatably mounted on a shaft 166 (Figs. 1, 2, and 11), journaled in the frames 60. The sleeve 167 has hubbed thereon a toothed segment 168, geared to the minimum movement 119 (Figs. 1 and 18). Also hubbed on sleeve 167 is toothed segment 169 which drives the pinion 159 securely mounted on the shaft 191, and a toothed segment 170 (Figs. 1, 11 and 18), which drives a pinion 181 (Figs. 1 and 18) secured on a transmission shaft 182 journaled in the frames 60. On the left end of the shaft 182 is a pinion 183, which drives a toothed segment 184 (Figs. 1 and 11) hubbed to a sleeve 185 rotatably mounted on the shaft 166, which bears on its right end a toothed segment 186, which drives the pinion 159 mounted on the shaft 194 (Fig. 10) which supports symbol carrier 161 for indicating the units of cents to the rear.

Also rotatably mounted on the shaft 166 (Fig. 1) is a sleeve 187 to which is secured a pinion 188 (Figs. 1 and 11) engaged by the minimum movement segment 111 (Fig. 1) associated with the "10 cent" key bank. Also securely mounted on sleeve 187 is a toothed segment 189 which drives the pinion 159 on shaft 192 (Fig. 10) which carries the "10 cent" symbols displayed to the front, and a toothed segment 190 which drives the pinion 159 on shaft 195 which carries the "10 cent" symbols displayed to the rear.

Also mounted on shaft 166 is a sleeve 199 (Figs. 1 and 11) having secured thereon a pinion 200 driven by minimum movement segment 128 representing the "dollar" key bank. A toothed segment 211 securely mounted on the sleeve 199 drives pinion 159 on the shaft 193 (Fig. 11) which actuates the "dollar" symbol carrier 164. A toothed segment 212 secured on the same sleeve 199 actuates a pinion 213 secured to a shaft 214 journaled in the frames 60 of the indicators. On the same shaft 214, which acts as a lateral transmission means, is secured a pinion 215 (Figs. 11 and 19) which actuates a toothed segment 216 secured on sleeve 217 mounted rotatably on shaft 166. On the right end of sleeve 217 is secured a toothed segment 218 which actuates the pinion 159 on shaft 196 (Fig. 10) which drives the symbol carrier, representing the "dollar" key bank, displaying to the rear.

In the above described fashion the differential settings of the minimum movement segments are transmitted to the shafts for rotating the front and rear symbol carriers, setting both to display the same data.

*Polygonal symbol carriers*

Figures 4, 5, 14, 15, 16, 17:
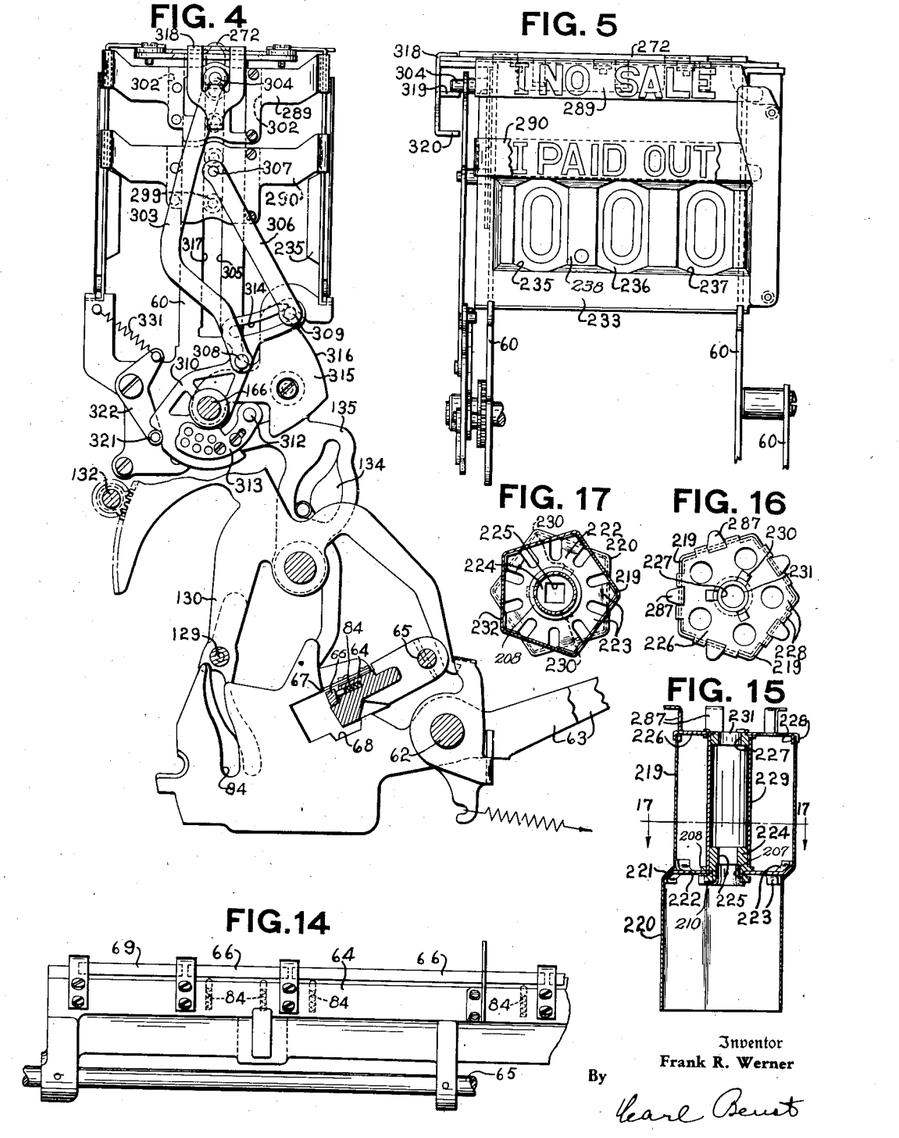
Fig. 4 is a vertical section of the mechanism for actuating the transaction indicator as viewed from the left.
Fig. 5 is a front elevation of part of the indicator mechanism showing the relation of the viewing apertures to the symbol carriers, and the driven elements of the transaction indicators.
Fig. 14 is a detail of part of the key coupler as seen from above.
Fig. 15 is a vertical section through an amount symbol carrier showing its internal construction.
Fig. 16 is a top plan view of an amount symbol carrier.
Fig. 17 is a cross sectional view of an amount symbol carrier taken on line 17—17, Fig. 15, and looking in the direction of the arrows.

The amount symbol carriers, best illustrated in Figs. 2, 6, 15, 16, 17, each consists of a tubelike shell 219 and 220 (Fig. 15) each having a pentagonal cross-section with one-half of the shell offset axially from the other half of the shell to the maximum degree, as illustrated in Figs. 15 and 17. The shell consists of what will be termed an upper half 219 and a lower half 220 (Fig. 15) divided by a waist 221. In this disclosure the upper half of the shell and the lower half of the shell each has five regular faces, making ten faces in all, to accommodate the ten digits in the decimal system of numbers. It is apparent that shells can be made having any number of sides or faces to accommodate the data sought to be indicated.

On the inside of each shell at the waist is a web 222 (Figs. 15 and 17) having radial members 223 bent to engage the included angles between the faces, the radial members being bent upwardly and downwardly, alternately, to fit above and below the waist 221 (Fig. 15). There are ten radial members 223, five of which cooperate with the angles between the faces of the upper half of the shell and five of which cooperate with the angles between the faces of the lower half of the shell.

A hub 224 (Figs. 15 and 17) having a square axial opening 225, a flange 208, and a tenon 207, which tenon is inserted in a circular hole in the web 222, is fastened to the web by means of a collar 210 slipped over the protruding end of the tenon 207, which is rounded over the collar. A tube 229, having three ears 230, which are inserted into clearance and positioning notches in the flange 208 and in the circumference of the hole in the web 222, is fastened to the assembled hub and web by bending the protruding ears 230 as shown in Fig. 17. The cooperation of ears 230, the notches in flange 208, and the notches in the circumference of the hole in the web 222 serves to position the square hole in the hub 224 at a determined orientation so that one of the sides of the hole is parallel to the plane of one of the upper faces of the symbol carrier and another side of the square hole is parallel to the plane of one of the faces on the lower part of the symbol carrier.

Covering the top opening of each symbol carrier is a cap 226 (Figs. 15 and 16) having a clearance hole 227 in the center thereof for its supporting shaft. Each cap 226 has ears 228 (Figs. 15 and 16) alternately engaging the inside and outside of the shell 219 for fastening it against radial displacement. In order to provide against the caps 226 being displaced vertically, each is connected with the rigid center web 222 by the tube 229 (Fig. 15) having three ears 230 (Figs. 16 and 17) on each end, which ears are inserted through slots, provided for that purpose in the web and cap, and bent over. Staked in the cap 226 is a collar 231 having a circular clearance hole for the shaft sufficiently small to prevent wobbling of the shell while being shifted or rotated.

This forces a systematic mounting of the symbol carriers, simplifying the assembly.

As seen in Figs. 2 and 6 the digits are shown placed on the shell symbol carriers so that starting at "0" placed on the one face on the upper half of the shell, the "1" is placed on an adjacent lower face 36 degrees from the face on which the "0" is placed. The "2" is placed on the upper half of the shell on the face 72 degrees from the "0" face. The remainder of the figures are placed alternately in the same fashion around the shells. It is to be noted that with the particular front and rear symbol setting transmission used herein, the symbols to be displayed to the front progress around the shell in a direction opposite to that for those shells having symbols to be displayed to the rear, as all the pinions 159 and their corresponding segments may then have their teeth cut in the same sense, which causes shafts 191, 192, and 193 to turn in a direction opposite to shafts 194, 195, and 196. The sequential positioning of the symbols on the shells is necessary in order to cooperate with the sequentially-arranged key lever cam slots 91. It is apparent that a different sequence of cam slots would necessitate a different positioning of the symbols.

Aperture plates 233 and 234 (Figs. 2, 5, 10, and 11) are provided for the front and back of the indicator respectively, which cover the shell symbol carriers so that but one face on each is visible at a given instant. Aperture 235 (Figs. 5 and 11) displays the "dollar" indication, aperture 236 displays the "10 cent" indication, and aperture 237 displays the "5 cent" indication. On a pillar 238 between the apertures 235 and 236, placed so as to be permanently visible, is the decimal punctuation mark.

As the apertures 235, 236, and 237 for viewing the symbols are only half the height of the symbol carriers, and as the shell symbol carriers in normal position display the upper numbers, means has been provided to shift the symbol carriers upwardly on their shafts when necessary to display a number on the lower half.

*Amount indicator shifting mechanism*

The symbol carriers are normally supported in the positions shown in Fig. 2 where all the apertures reveal the digits on the upper half of the symbol carriers.

A shaft 239 (Figs. 2, 6, and 7), to which are secured pinions 240 and 241 (Fig. 7), has either end projecting into vertical bifurcations 242 (Fig. 6) in the vertical indicator frames 60 so as to allow the shaft to be raised and lowered therein. Secured to the frames 60 are racks 243 and 244 cooperating with the pinions 240 and 241 respectively to keep shaft 239 horizontal while being raised or lowered, though the actuating force is applied only at the right end of the shaft, through a link 245 to which the shaft 239 is pivotally connected. Up and down movement of this link, supplied by a lever 246 (Figs. 6 and 7), moves shaft 239 likewise. The lever 246 is securely mounted to a pinion 247 (Fig. 7) rotatably mounted on stud 248 supported by one of the frames 60. The pinion 247 is rotated once for each machine operation by a pinion 249 secured to the drive shaft 71 before described.

Depending from shaft 239 (Fig. 7) are two links 261 and 262 joined together by twin yokes 263 and 264 (Figs. 2, 6, and 7). At the juncture of each link with the yokes, a guide stud 265 (Fig. 7) is provided to travel in the aforementioned vertical bifurcation 242 in the frames 60 so as to prevent the yokes from having any but a vertical motion. Yokes 263 and 264 each have three upwardly projecting arms 266, 267 and 268, and 269, 270 and 271, respectively, for supporting and lifting the amount symbol carriers on their shafts.

The arms 266, 267, and 268 (Fig. 7) support the symbol carriers for front display, and the arms 269, 270, and 271 support the symbol carriers for rear display. These arms have their upper ends bent horizontally each of which has a clearance slot for one of the shafts 191, 192, 193, 194, 195, and 196. The arms are of such length that they extend through the openings in the bottom of their associated shell symbol carriers, the bent over ends acting as bearing points for the webs 222 of the symbol carriers when in normal or down position.

Once each machine operation the six symbol carriers are thus lifted by the raising of the shaft 239 as has been explained.

The mechanism for selecting which symbol carriers shall be retained in the raised position is closely related to the alining mechanism for the amount indicators and will be discussed next.

*Symbol carrier selecting and alining mechanism*

A plate 272 (Figs. 4, 6, 7, 10, and 11), resting on the top of the frames 60 (Fig. 10) is shiftable horizontally from left to right, and held by cross pieces 155 against movement in other directions. Plate 272 is yieldingly held to the right by a spring 275 (Fig. 10) the extreme right position being determined by a retaining member 318 (Figs. 5 and 10) to be described, striking against a bracket 327, secured to one of the frames 60.

A train of mechanism, including a cam 281, actuates the slide 272 in a manner hereinafter described. Due to closeness in timing the spring 275 is provided to take up any lost motion or slack in the mechanism for moving the slide 272 to the right. The mechanism whereby the cam 281 actuates the slide 272 is as follows:

Secured to the underside of slide 272 is a bracket 276 (Figs. 6, 7, and 10) having a bifurcation engaging a stud 277 (Fig. 7) on a bell crank lever 278, mounted pivotally on stud 279 extending from a frame supported bracket 280. Clockwise movement of bell crank lever 278 allows movement of slide 272 to the right in response to spring 275 and counter-clockwise movement of bell crank lever 278 causes movement of slide 272 to the left. Slide 272 is shifted from its normal position to the left and back to normal during the first half of each machine operation by means of a face grooved cam 281 (Figs. 7 and 8) which is secured on the drive shaft 71, before described. Cam 281 makes one rotation each machine operation and through cam follower 282 mounted on lever 283 (Fig. 8) pivoted at one end to transverse shaft 132 and at the other end to link 285 (Figs. 7 and 8), causes said lever to oscillate once each machine operation. The other end of link 285 is pivoted to bell crank lever 278.

Secured to the top of each of the shafts 191, 192, 193, 194, 195, and 196 is a ten toothed alining wheel 291 which, cooperating with studs 286 (Figs. 6, 7, and 10) on arms 273 (Figs. 7 and 10), projecting from the slide 272, of which there is one for each wheel, lock and aline the symbol carriers when the slide 272 is in normal position or the right-hand position. The shifting of slide 272 to the left unlocks the symbol carriers for the differential setting of the symbol carriers after which the slide returns to the right locking the symbol carriers, as far as their rotation is concerned, in the new position. All this occurs during the first half of the machine operation.

Formed integral with the cap piece 226 of each shell symbol carrier are five upwardly projecting hooks 287 (Figs. 10, 15, and 16) adapted to engage laterally projecting fingers on downwardly projecting arms 288 (Figs. 6, 7, and 10) of slide 272, one of which is provided for each shell symbol carrier. The hooks 287 are so positioned on the caps that the engagement of an arm 288, and its associated hook 287, can occur only when one of the faces on the lower half of that particular symbol carrier is in position to be displayed through the aperture plate. The slide 272 moves to the left before the lifting of the symbol carriers which are thereupon released for shifting and rotating. Before the shell symbol carrier lifting mechanism is again lowered, the slide 272 moves to the right, and if any of the faces on the lower half of the symbol carriers are in position to be displayed, that symbol carrier will have one of its hooks 287 engaged by an arm 288 which holds that particular symbol carrier raised until the beginning of the next machine operation. If a face on the upper half of a symbol carrier is turned so as to be displayable the symbol carrier will not be held in the raised position but will drop so as to render that upper face visible through the aperture. In Fig. 6 the right symbol carrier is shown in the raised position where it is retained by its hook.

*Transaction indicator*

The disclosed machine will indicate three kinds of transactions, namely, cash, paid out, and no sale. There are two transaction keys, "paid out" and "no sale." If no transaction key is used, the indicator for a "cash" transaction will be in view.

The "paid out" symbol is marked on the aperture plate 233 in the position shown in Fig. 5. If either a "cash" or a "no sale" transaction is to be indicated, that symbol, marked on a separate target, is placed in such a position that it covers the "paid out" symbol and is itself displayed. A screen 251 (Fig. 2) placed in front of each aperture plate screens all of the aperture plates from view except the apertures 235, 236, and 237, and the space occupied by "I paid out" as seen in Fig. 5.

The "no sale" target 289 (Figs. 4, 5, 10, and 11) and the "cash" target 290 are U shaped, the closed ends encircling the left side of the indicator mechanism, one free end of each extending horizontally before the front aperture plate and the other free end of each extending horizontally before the rear aperture plate. The front and rear arms bear the same symbols.

To the closed ends of the "no sale" target are secured two embracing flanges 302 (Figs. 4 and 11) which are hooked around the left frame 60 of the indicator mechanism which flanges serve as guides for the vertical movement of the target. The target 289, shiftable in a vertical direction only, is actuated by a link 303 pivotally connected to it by a stud 304 which travels in a bifurcation 305 in the said left indicator frame 60. The "cash" target 290, mounted on the same frame plate 60 below target 289 in the same manner, is actuated by a link 306 pivotally connected to it by a stud 307.

The target 290 is shown in Fig. 4 in its home position covering the "paid out" symbol on the aperture plate. In a "paid out" transaction the "cash" target 290 drops below the apertures 235 in the aperture plate revealing the "paid out" symbol marked on said plate. During this operation the target bearing the "no sale" symbol drops a distance about equal to its width but not sufficiently to come into viewing position. If the "no sale" key is next depressed the "cash" target 290 stays below the apertures, as in "paid out" transactions, and the "no sale" target drops into viewing position. Due to the minimum movement segment, the targets are not returned to home position before being differentially set.

The links 303 and 306 are connected by studs 308 and 309 respectively, to a lever 310 rotatably mounted on shaft 166. Also rotatably mounted on shaft 166 is a pinion 311 (Fig. 11) which is connected to lever 310 by a pin 312 (Figs. 4 and 11) and to an adjustment plate 313 screwed to said lever. As the pinion 311 turns in response to the depression of a transaction key, which imparts motion thereto by means of cam slots 68 (Figs. 1 and 4), universal bar 129, actuator 130, pinion 131, transmission shaft 132, pinion 133, segment 134 and minimum movement segment 135, the lever 310 is turned differentially. there are three possible positions of this lever in the construction disclosed, that shown in Fig. 4 being the home position and displaying the "cash" target. A clockwise movement of lever 310 of approximately 45 degrees will draw the target 290 to below the aperture openings 235, which movement is supplied through stud 309 and link 306. Stud 309 is slidably mounted in a slot 314 in lever 310, but is held in the outer end of said slot by cam plate 315 secured to the frame work of the machine. Cam plate 315, to hold stud 309 in the outer end of slot 314, has an arcuate edge 316 which has shaft 166 as a center. After 45 degrees of clockwise motion of lever 310 the stud 309 has reached the lower end of the edge 316 whereupon stud 309 is permitted to travel in slot 314, and is made to do so as a guide stud 299 on the target 290 has then reached the bottom of the bifurcation 317 in the left frame 60 of the indicator mechanism. Further clockwise motion of lever 310 for 45 degrees is permitted, causing link 306 to turn clockwise around stud 307 as a center without moving target 290. During the last 45 degrees of clockwise motion of lever 310 the "cash" target remains in its position below the apertures 235.

Lever 310 rotating clockwise the first 45 degrees also lowers the "no sale" target 289 but not sufficiently to make it visible. The second 45 degrees of clockwise rotation brings target 289 to visible position covering the "paid out" symbol. This motion to target 289 is supplied by lever 310 through stud 308, link 303 and stud 304 as described. Motion of lever 310 in a counterclockwise direction reverses the motions of the targets. As the lever 310 may be in any one of the three positions when a transaction key is depressed the minimum movement segment 135 determines in which direction said lever 310 will be rotated.

To insure that said "no sale" target will remain in place in either of its upper two positions after the key coupler has returned to normal position, leaving the minimum movement device subjected to movement by the gravitational pull on the target mechanism, a retaining member 318 (Figs. 4, 5, and 10) is fastened to the left end of the alining slide 272. One finger 319 (Fig. 5) of the retaining member engages stud 304 when in the uppermost position as shown. Another finger 320 of the hook engages stud 304 when in the intermediate position indicating a "paid out" transaction. During the setting of the transaction indicators, slide 272 (Fig. 10) is moved to the left position leaving stud 304 free. The slide 272 moves to the right before the key coupler commences its return motion thus locking this target against displacement by gravity. The lowest or "no sale" positioning needs no such lock since when the stud 299 rests in the bottom of bifurcation 317 the lever 310 is stopped from rotation, and therefore the link 303 is stopped in a position to display the "no sale" indicator 289 at the viewing point. The locking of target 289 in either of the upper two positions also locks target 290, through the connections including links 303 and 306.

To hold the indicators in the "cash" position, which is the usual register transaction, even when the locking action of fingers 319 and 320 is ineffective, a roller, carried by a spring actuated lever 322 (Fig. 4), engages a notch on lever 310 holding it yieldingly against turning. A spring 331 fastened to the other arm of the bell crank lever supplies the resilient force sufficient to temporarily hold the transaction targets in the uppermost position.

Clerk's indication

Provision for two clerks identification symbols have been made. On all the transaction indication symbols there is an accompanying symbol I indicating a transaction by the clerk having that identifying symbol. Therefore the key bearing the symbol I does not need to, and does not, control any indicating mechanism.

If clerk II operates the register, using the II key, a target bearing the symbol II is lowered in front of the I symbol that would otherwise be visible.

Figure 11:
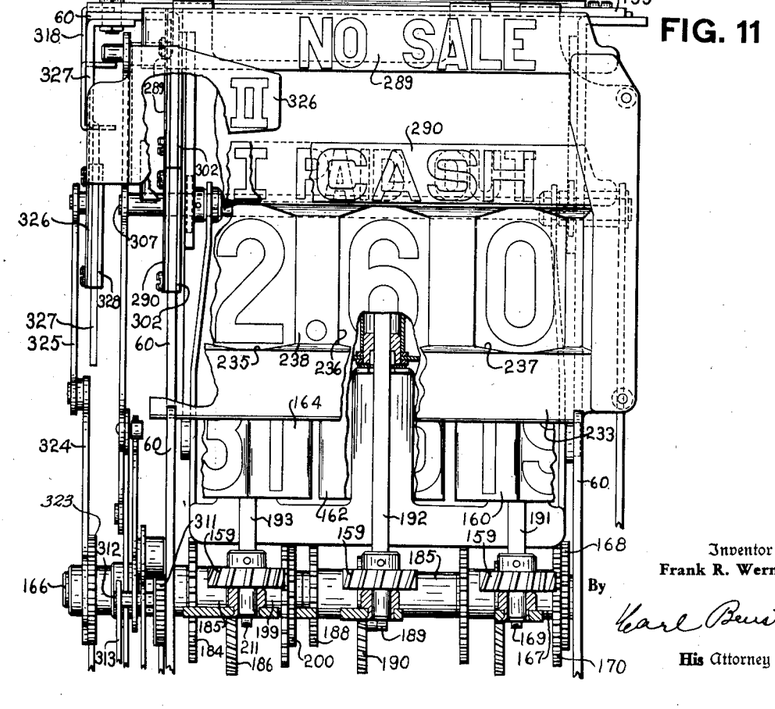
Fig. 11 is a front elevation of the indicator mechanism, with certain parts broken away.
Figure 21:
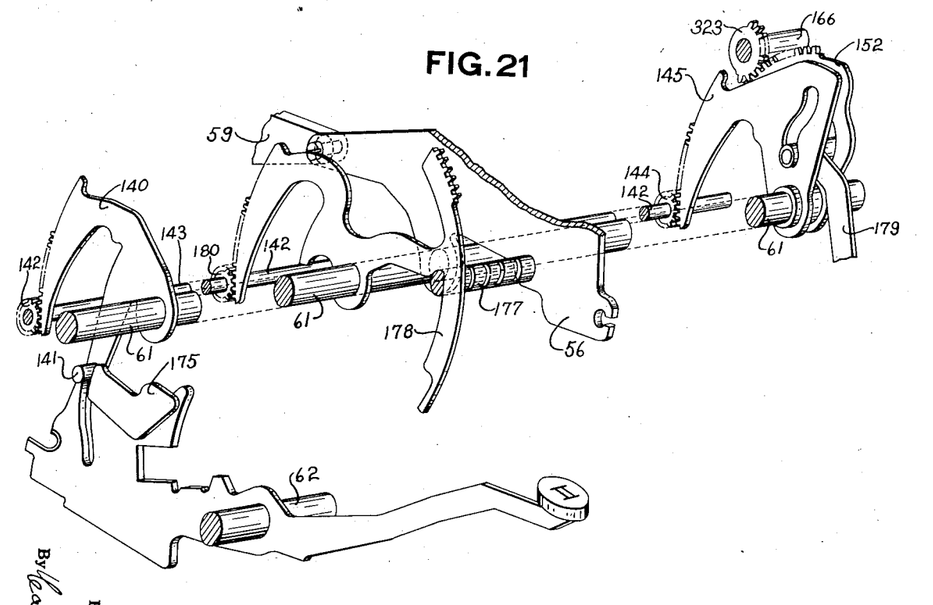
Fig. 21 is a perspective diagrammatic view of a portion of the mechanism for setting the clerk's indicating mechanism.

Key II (Figs. 1 and 21) through the stud 141, segment 140, pinion 142, shaft 143, pinion 144, segment 145, and minimum movement segment 152, differentially positions a segment 323 rotatably mounted on shaft 166. Hubbed to the segment 323 is a lever 324 (Figs. 1 and 3) which is pivoted to a link 325 (Fig. 3) whose upper end is pivoted to the closed end of a U shaped clerk's II target 326 (Figs. 3, 10, and 11) one free end of which extends horizontally before the front aperture plate and the transaction indicators, and the other free end of which extends horizontally before the rear aperture plate and transaction indicators in the same manner. As shown in Fig. 11, the free ends of said clerk's symbol carrier are just long enough to cover the symbol I on the symbol with which it is alined.

A guide bracket 327 (Figs. 3, 10, and 11) secured to the bent over top of the left indicator frame 60 (Fig. 11) has a downwardly projecting portion acting as a support and guide for clerk's target 326. The target 326 has secured thereto flanges 328 (Fig. 11) which embrace the guiding portion of the guide bracket 327. The guide bracket 327 also contains a vertically positioned slot 329 (Fig. 3) into which studs 330 project, limiting the possible vertical motion of the target.

Lever 324 and link 325 are shown in Fig. 3 in rest position. As lever 324 is turned differentially by pinion 323 in response to depression of the II key the toggle formed by lever 324 and link 325 is broken causing the target 326 to lower and cover the symbol I on the transaction symbol that is visible at that time. The II symbol is shown, in its normal position in Fig. 11 hidden from view.

To prevent the symbol II from falling from normal position to viewing position due to gravity, a hook 341 (Fig. 3) is provided on the lower end of link 325 which engages a stud 342 on lever 324 thus causing the target to lock itself by its own weight, in ineffective position.

Whenever the II indicator has been moved to viewing position, by operating the register under control of the II key, it will remain in viewing position until the next machine operation which does not involve the use of the II key. On machine operations not involving the use of the II key, the segment 140 (Fig. 21) is held in home position on one side by a plate 175 attached to the key lever and on the other side through pinion 142 and shaft 143 which is kept from moving in a retrograde direction through home position by being connected by pinion 180 to a toothed segment 178 rotatably mounted on shaft 61, which bears against the alining bar 177 in home position. Alining bar 177 is secured between two auxiliary frame plates, only one plate 56 being shown. The "Clerk's" differential system being held in home position, the oscillation of the key coupler will, through link 179, position the segment 152 and the segment 323 to home position, which raises the II indicator out of sight, exposing the I symbol to view.

Operation

By pressing an amount key only, the indication will show a cash transaction by the I clerk thus eliminating the necessity for having mechanism for indicating a cash transaction by any clerk, or indicating any transaction by the I clerk.

Other than a cash transaction requires the depressing of the appropriate key for its indication.

A transaction by the II clerk requires the depressing of that key in addition to the proper transaction key.

There is an indicator for each bank of keys. The failure to operate a key in the clerk's bank will result in the symbol I showing; failure to operate a key in the transaction bank will result in the symbol "cash" showing; failure to operate a key in the dollar bank will result in a blank ace showing as the place where the zero ordinarily would show is left blank, inasmuch as a zero to the left of the decimal point has no significance where no provision is made for registering tens of dollars; failure to depress a key in either the dimes or five cent key banks results in zero showing therein unless the dimes bank operates the five cent coupler.

The indication of the last transaction remains in evidence until the next transaction is commenced.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In an indicating mechanism, the combination of a plate bearing a symbol; a supporting member; an upper target slidably mounted on the supporting member; a lower target slidably mounted on the supporting member which at rest position covers that part of the plate bearing the symbol; a common differentially settable member associated with both targets; a means connecting the lower target with the differentially settable member; a means connecting the upper target with the differentially settable member; and means for setting the differentially settable member so that the lower target is moved from normal position to uncover the symbol on the plate or to be replaced in position by the upper target.

2. In an indicating mechanism, the combination of a plurality of movable symbol carriers each of which bears a single symbol; a plate having a viewing aperture; a common differentially settable means associated with the symbol carriers; and means continuously connecting each symbol carrier to the differentially settable means so as to move each symbol carrier to and away from viewing position at different times during the complete motion of the differentially settable means.

3. In an indicating mechanism, the combination of a differentially settable means settable to a plurality of positions; a plurality of movable symbol carriers; and means connecting the differentially settable means and each symbol carrier so that each symbol carrier has an individual motion both as to velocity and distance.

4. In an indicating mechanism for a machine of the class described, the combination of a differentially settable member; two symbol carriers each having a display position and a concealed position; and means continuously connecting each of the symbol carriers to the differentially settable means whereby one of the symbol carriers is moved continuously by the moving differential means and the other symbol carrier is moved discontinuously by the same movement of the differential means.

5. In an indicator mechanism for a machine of the class described, the combination of a differentially settable member; two movable symbol carriers having the same operative plane; a cam plate; a link pivotally connecting one symbol carrier to the differential member so as to be moved directly thereby; and a second link pivoted at one end to the second symbol carrier and at the other end slidably mounted in a slot in the differential member by means of a stud said stud also cooperating with the cam plate to interrupt the motion of said second symbol carrier before completion of the motion of the differential member whereby the first-mentioned symbol carrier is invariably moved by movement of the differential member and the second symbol carrier is moved only during a portion of the movement of the differential member.

FRANK R. WERNER.